AIR DISTRIBUTION DEVICES

Original Filed June 12, 1964 3 Sheets-Sheet 1

INVENTORS:
EUGENE F. AVERILL
MARVIN L. KLOOSTRA
BY: Marzall, Johnston, Cook & Root
ATT'YS

AIR DISTRIBUTION DEVICES

Original Filed June 12, 1964 3 Sheets-Sheet 2

INVENTORS:
EUGENE F. AVERILL
MARVIN L. KLOOSTRA
BY: Marzall, Johnston, Cook & Root
ATT'YS

AIR DISTRIBUTION DEVICES

Original Filed June 12, 1964 3 Sheets-Sheet 3

INVENTORS:
EUGENE F. AVERILL
MARVIN L. KLOOSTRA

BY: Marzall, Johnston, Cook & Root
ATT'YS

United States Patent Office

Re. 26,723
Reissued Nov. 25, 1969

26,723

AIR DISTRIBUTION DEVICES

Eugene F. Averill, Waterloo, and Marvin L. Kloostra, Cedar Falls, Iowa, assignors to Titus Manufacturing Corporation, Waterloo, Iowa, a corporation of Iowa Original No. 3,264,972, dated Aug. 9, 1966, Ser. No. 374,693, June 12, 1964. Application for reissue Dec. 27, 1967, Ser. No. 706,995

Int. Cl. F24f *13/06*

U.S. Cl. 98—40 9 Claims

Matter enclosed in heavy brackets [ ] appears in the original patent but forms no part of this reissue specification; matter printed in italics indicates the additions made by reissue.

*ABSTRACT OF THE DISCLOSURE*

*Air diffusers embodying perforated plate air outlet with air deflector extending across upstream side of perforated plate and opposite air inlet; deflector comprises plurality of individually orientable sections, each section having narrow, pitched webs with openings between webs to give one way or multiple way lateral discharge through perforated plate.*

This invention, in general, pertains to air distribution devices particularly adapted to serve as the room outlet in an air distribution system. The invention has particular relation to air distribution devices in which the air is discharged into the room through a perforated plate or panel lying flush with or substantially flush with the ceiling.

Ceiling air distribution devices or diffusers ordinarily are constructed so that the air distribution from the diffuser is discharged in one of several directions lateral to the axis of the diffuser and substantially parallel to the ceiling. This air discharge pattern is particularly important in a distribution or diffusion of cool air so that the cooler air discharged by the diffuser is spread laterally adjacent to the ceiling. A direct, downward pattern is disadvantageous because it creates a cool draft and also is not as efficient in maintaining a uniform temperature throughout the room.

This invention, briefly, pertains to improvements in diffusers having a perforated face through which the air from the diffuser is discharged into the room. Several forms of these diffusers are already known, one of which utilizes an imperforate member smaller in area than the area of the diffuser inlet for discharging the air laterally from the diffuser. Three disadvantages have been observed with such diffusers. First, the portion of the perforated face or plate covered by the imperforate member does not have air flowing therethrough, and this portion of the perforated plate assumes a different shade than the shade of the uncovered areas of the perforated plate as the diffuser is used and dirt is deposited on the face of the plate. Furthermore, this type of diffuser requires a system of baffle plates mounted in or adjacent the neck area of the diffuser to provide a one-way, two-way, or three-way air discharge pattern. In effect, the baffle plates block off flow of air from one or more sides of the diffuser. It is apparent that such blocking off reduces the effective outlet area of the diffuser through the perforate plate. In a one-way pattern, for example, only about one-fourth of the discharge area of the perforate plate is being utilized in this type of diffuser. Thirdly, there is always a portion of the perforated face area which is inactive (no air passing therethrough), even in a four-way pattern.

It is an object of this invention to provide improvements in air distribution devices utilizing a perforated plate in which the air from the diffuser is discharged by utilization of deflector members comprising substantially planar, open members having interlinked webs sloping relative to the general plane of the deflector with openings between the webs through which air flowing through the device may be passed and laterally deflected by the webs prior to exit of the air through the perforated plate.

Another object of the invention is to provide air distribution devices of the aforesaid character wherein the deflector comprises one or more sections of expanded metal formed with webs and openings of the aforesaid character.

Still another object of the invention is to provide air distribution devices comprising selectively orientable sections, each section having webs and openings of the aforesaid character, whereby the sections can be selectively oriented to provide different types of air discharge patterns.

A more specific object of the invention is to provide air distribution devices with an air deflector comprising selectively orientable sections releasably held in the desired air deflection orientation by attaching means on the upstream face of the perforated plate.

Still another object of the invention is to provide air distribution devices of the aforesaid character wherein the upstream portion of the air distribution devices comprises a large chamber covered at the upstream end by a plate to which may be selectively attached an inlet sleeve or duct of the desired, selected size whereby a given air distribution device can be used over a broad range of inlet sleeve or duct sizes.

Another object relates to providing perforated face diffusers capable of utilizing substantially all perforated face area for air discharge in various, laterally-outwardly, air discharge patterns.

These, as well as other objects and advantages of the invention may be attained by the air distribution devices of the invention comprising walls defining an air passage having an inlet and an outlet of substantially larger area than the area of the inlet with a thin, substantially flat, perforated plate extending across the outlet. The air flowing through the air distribution device is deflected laterally in one or more directions before it is discharged through the perforated plate by an open, air deflector extending across the air passage downstream of the inlet and upstream of the perforate plate. The air deflector lies over an area of the perforate plate which usually is larger, but in some cases may be substantially the same as or somewhat smaller, than the area of the inlet. The air deflector has webs sloping relative to the general plane of the deflector with openings between the webs through which air flowing through the device passes and is laterally deflected by the webs prior to exit through the perforate plate. In a preferred form, the air deflector is made of one or more sections of expanded metal formed with webs and openings of the aforesaid character.

A versatile form, as regards selectivity in air discharge patterns, utilizes an air deflector made in selectively orientable sections, each section formed with webs and openings of the aforesaid character, whereby the webs in each section may be positioned in different orientations to selectively provide a one-way, two-way, three-way, or four-way air discharge pattern. In the most preferred form, the air deflector is composed of four rectangular sections oriented as quadrants of equal or unequal areas, each section having webs and openings of the aforesaid character, to provide a substantially rectangular, sectioned air deflector positioned opposite the inlet or the air distribution device.

Preferred embodiments of the invention are illustrated in the accompanying drawings, wherein.

Figure 1:
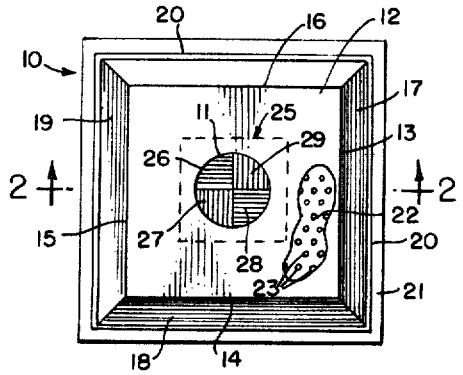
FIG. 1 is a top plan view of a preferred embodiment.
Figure 2:
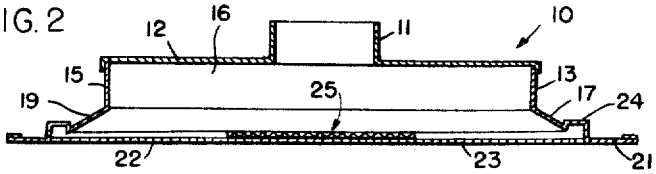
FIG. 2 is a section of the embodiment of FIG. 1 taken on section plane 2—2 of said figure.
Figure 3:
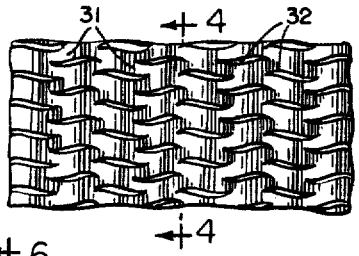
FIG. 3 is an enlarged, fragmentary, plan view of an expanded metal piece used to provide the sections of the air deflector in the embodiment of FIG. 1.
Figure 4:
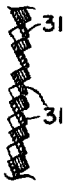
FIG. 4 is a section taken on section plane 4—4 of FIG. 3.

Referring to the drawings, the illustrated air distribution device 10 comprises an inlet sleeve 11 adapted to be attached to a supply duct or an air distribution system. The inlet sleeve is mounted on and extends through a top plate or cap plate 12 fixedly or removably secured to the upstream, side walls 13, 14, 15 and 16 of the diffuser. The plate 12 and walls 13–16 define an upstream chamber of the diffuser which is of large cross-section relative to the downstream or discharge area of the diffuser. The purpose for having such a large chamber is to accommodate the attachment of sleeves 11, which may be round or rectangular as desired, to the plate 12, to meet the demands encountered in the field for various flow volumes by merely selecting the required size inlet sleeve 11 and mounting it on the plate 12.

The downstream portion of the air chamber or passage of the diffuser comprises outwardly flaring walls 17, 18, 19 and 20 connected to the downstream ends of the upstream side walls 13–16, respectively. The periphery of the diffuser comprises a peripheral flange 21 adapted to lie against the ceiling adjacent an opening provided therein to accommodate the diffuser.

The downstream, discharge opening is covered by a perforated plate 22 which is thin, substantially flat and has perforations 23 occupying a total area comprising at least about 35% of the area of the plate 22. The plate 22 is thin enough so that the laterally deflected air is passed through openings 23 in an outwardly and lateral flow path.

The downstream ends of the flared walls 17–20 may have formed thereon a rim 24 provided with holes (not shown) through which may extend screws, bolts, or the like by which the diffuser is mounted on the structural members, hanger brackets, or the like in the ceiling. Also, holes in the rim 24 may be utilized to receive metal screws or bolts (not shown) by which the perforated plate 22 is supported on the diffuser.

The air deflector 25 comprises, in the most preferred form, a plurality of sections of open, air deflecting members, each section being selectively orientable. In the illustrated embodiment, the air deflector 25 comprises 4, rectangular, open sections 26, 27, 28, 29 oriented as quadrants of the air deflector. The air deflector 25 lies over an area of the plate 22 which is larger than the area of the inlet 11. In the largest extreme, the deflector 25 may lie over the entire area of the perforated plate 22.

Each section 26–29 is an open section having pitched webs 31 pitched in the same general direction with openings 32 between the pitched webs. Air flowing downwardly against the upstream face of the deflector sections is deflected by the pitched webs 31 and flows through the openings 32 in a downward and lateral direction. The sections 26–29 are made from expanded metal which is slit, expanded and formed to provide the pitched webs 31 and the openings 32. It is realized, of course, that the sections 26–29 can be made of other materials such as molded thermoplastic polymers, or the like.

The section 26–29, as illustrated, are oriented so that each section deflects the air in a different, lateral direction, i.e., toward each of the four sides of the diffuser 10. It will be appreciated, however, that other orientations can be used to provide patterns other than the four-way pattern obtained in the orientation illustrated. For example, sections 26–29 may be oriented so that the webs 31 of each section each are pitched in the same direction, whereby a one-way pattern is obtained. If the sections are oriented so that two sections deflect the air toward one side of the diffuser, while two opposite sections deflect air toward the opposite side of the diffuser, a two-way pattern results. Similarly, various types of three-way patterns are obtained by orienting one of the sections 26–29 with its webs pitched in the same direction as one of the other sections.

It will be further appreciated that the sections of the deflector 25 need not be four sections in the case of one-way, two-way or three-way patterns. In the one-way pattern, for example, the deflector 25 may be a unitary piece of expanded metal with the webs all pitched in the same general direction. In the two-way pattern, only two sections with webs pitched in opposite directions are required, while in the three-way pattern only three sections can be utilized. The four section deflector, however, is preferred because it has the versatility of providing one-way, two-way, three-way, or four-way patterns. In the most preferred form, the four sections of the deflector are arranged as quadrants of the whole deflector, which quadrant may be of equal or different areas.

The sections 26–29 may be mounted in the diffuser between the inlet opening and the upstream face of the perforated plate 22, preferably in the downstream portion of the diffuser, by many different types of mounting structures. One preferred form comprises a clip or holder 35 comprising a bottom plate 36 adhesively or otherwise fixedly mounted on the perforated plate 22. A top plate 37 having a center web 38 fixedly attached to the lower plate 36 has upwardly bent arms 39 holding wing plates 40 and 41 in spaced relation to the bottom plate 36.

A corner of each section 26–29 is held between the bottom plate 36 and the springable wing plates 40 and 41 to hold the sections 26–29 in place adjacent the perforated plate 22.

Figure 7:
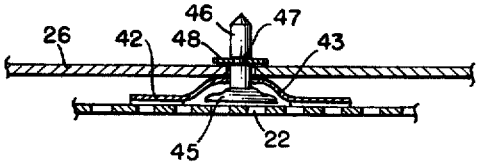
FIG. 7 is a fragmentary, side elevation of another preferred embodiment showing another means for mounting a section of the open, air deflector in the diffuser.

Another embodiment of means for holding the sections 26–29 is shown in FIG. 7. In this embodiment, each section is held in place by providing one or more discs 42 adhesively secured or otherwise suitably secured to the upstream face of the perforated plate 22. The disc 42 has a hub 43 projecting upwardly and provided with a hole therethrough. The hub 43 provides a hollow space in which is seated the head 45 of upwardly-extending pin 46. The shank of the pin 46 has a peripheral groove 47 in which is removably seated a U-clip, C-clip, or like snap-type fastener 48. The snap fastener 48 holds the respective section 26, 27, 28, or 29 on the shank of the pin 46, which extends through the section, with the section resting on the upper surface of the hub 43. The fastner 48 and hub 43 are in spaced relationship to hold relatively tightly the sections in the mounted position.

Figure 5:
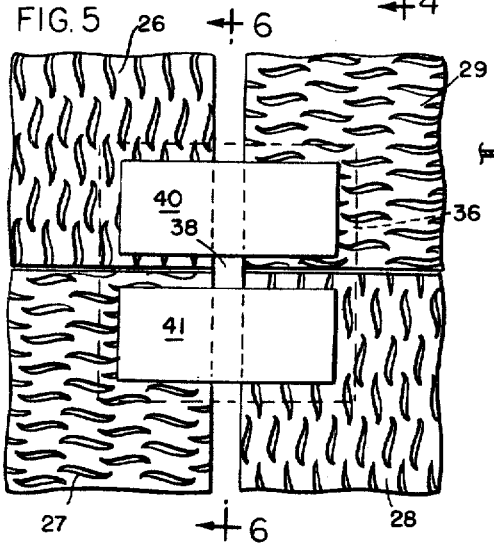
FIG. 5 is an enlarged, fragmentary, top plan view of one preferred embodiment for holding the sections of the open, air deflector in position in the diffuser.
Figure 6:
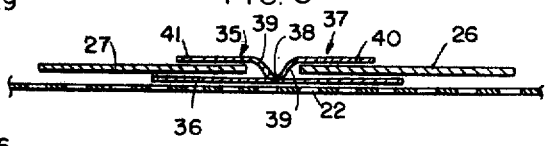
FIG. 6 is a section taken on section plane 6—6 of FIG. 5.

The foregoing embodiments in FIGS. 5–7 have the advantage that the sections are quickly mounted or unmounted to orient the sections 26–29 in the desired position. Other attachable and detachable mountings may also be used. Also, the deflector section or sections may be fixedly secured to the diffuser in spaced relation to or lying against the perforated plate 22 without departing from the scope and spirit of the broad concepts of the invention herein disclosed.

Figure 8:
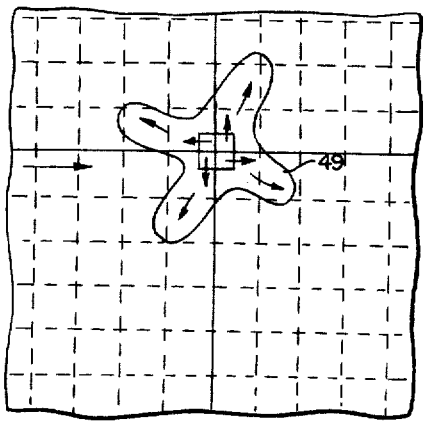
FIG. 8 is a schematic view of an air discharge pattern or isovel of a diffuser of the invention with the deflector sections oriented to provide a four-way pattern and lying over substantially the entire area of the perforated plane of the diffuser.
Figure 8A:
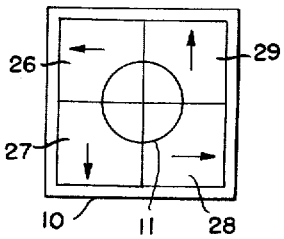
FIGS. 8A, 9A and 10A are enlarged, schematic views showing the relative sizes of the diffuser inlet, deflection section, and perforated plate outlet for the diffusers of FIGS. 8, 9, and 10, respectively.
Figure 9:
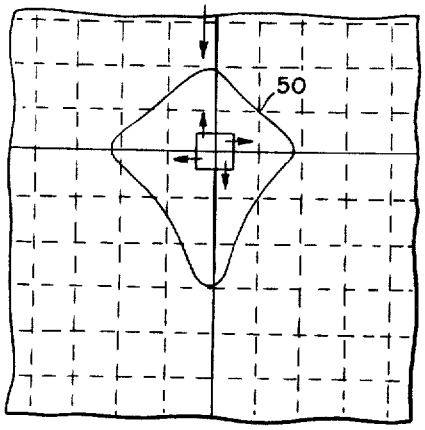
FIG. 9 is a similar view showing the air discharge pattern or isovel of a diffuser having the deflector sections oriented to provide a four-way pattern and lying over an area of the perforate plate which is only slightly larger than the inlet area of the diffuser.
Figure 9A:
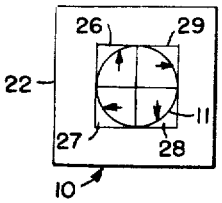
Figure 10:
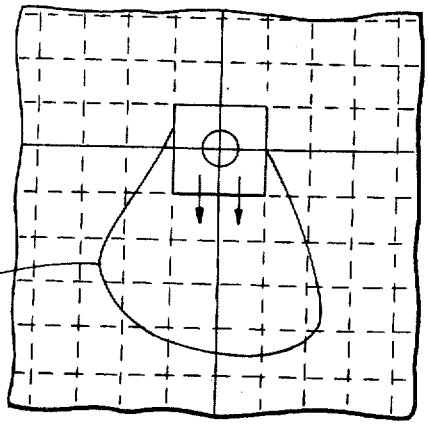
FIG. 10 is a view similar to FIG. 8 with the deflector sections oriented in the same deflecting direction to give a oneway pattern.
Figure 10A:
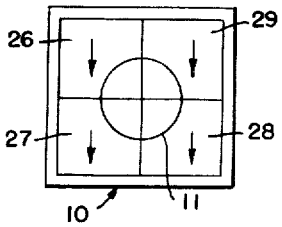

The throw pattern diagrams (isovels) shown in FIGS. 8, 9 and 10 illustrate variations in throw patterns obtainable with a four-way deflector providing a deflecting area only slightly larger than the inlet area of the diffuser (FIG. 9) and a throw pattern with a similar four-way deflector having an area which is substantially equal to the area of the perforated plate 22 (FIG. 8). The cross shaped isovel 49 of FIG. 8 outlines points adjacent the ceiling of an air flow velocity of 100 feet per minute from a diffuser having a round, 7″ diameter sleeve or neck 11 with the sections 26–29 covering substantially the whole area of the perforated plate 22 at an air supply of 150 cubic feet per minute. The 100 feet per minute isovel obtained with the same diffuser under the same air supply rate but with smaller air deflector sections 26–29 is shown in FIG. 9. In the latter case, the air deflector sections covered an area of the perforated plate which was 7″ x 7″ and positioned directly opposite the inlet 11. The isovel in this case is a diamond-shaped isovel. The isovel 51 of FIG. 10 is that of the diffuser of FIG. 8 with sections 26–29 oriented for a one-way pattern. For this pattern, the deflector preferably covers substantially the entire face of the perforated plate.

Other throw patterns with the same diffuser under the same conditions can be obtained by using sections 26–29 having sizes intermediate the two extremes illustrated in FIGS. 8 and 9.

Thus, it will be appreciated that the arrangement of the deflector sections 26–29 can be varied to provide a throw pattern best suited for a particular room or zone in which a given diffuser is mounted. For example, for a four-way pattern, the sections 25–29 may be cut in triangles which, upon assembly, provide a rectangular deflector 25 by positioning the legs of the triangles in side-to-side relationship and orienting the webs 31 of each section to pitch in the direction of the base of the triangles. Furthermore, the outer corner of each of the sections 26–29, as illustrated in the drawings, may be mounted to provide another variation of throw pattern. These are but a few examples of the multitude of variations which can be used in the shape, arrangement and orientation of open, deflector sections forming the open, deflector 25 in the diffusers of the invention herein disclosed.

Figure 11:
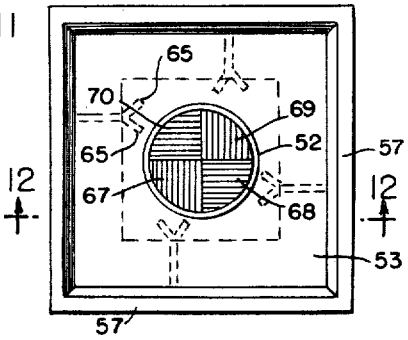
FIG. 11 is a top plan view of another diffuser embodiment of the invention.
Figure 12:
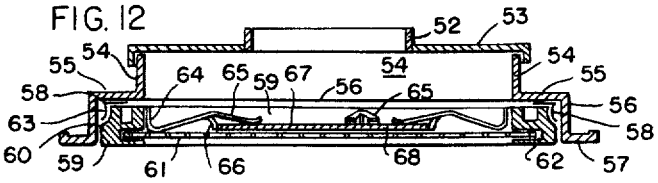
FIG. 12 is a section taken on section plane 12—12 of FIG. 11.

The diffuser of FIGS. 11 and 12 comprises an inlet sleeve 52 mounted in and projecting upwardly from the top plate 53. The top plate 53 rests on the upper edges of the four walls 54 forming the upstream portion of the hollow diffuser. The lower portion of the hollow diffuser is defined by the outwardly extending walls 55 and downwardly extending walls 56, the lower edges of the latter being provided with an outwardly extending flange 57 extending about the periphery of the lower edge of the diffuser. The walls 55 and 56 form peripheral spaces in which are mounted on the under surface of walls 55 springable arms 58. The arms 58 have a downwardly depending, springable arched arm 63 adapted to springably hold a frame 59 by the seating of the springable, arched arms in arched grooves 60 in the frame 59. The frame 59 holds the outer edges of the perforated diffuser plate 61 in the inwardly directed grooves 62 in each of the sides of the frame 59. Thus, the frame 59 and perforated diffuser plate 61 are removable from the diffuser.

Each of the sides of frame 59 has mounted on the inner wall thereof a spring arm 64 having at the outer ends forked, spring arms 65. The forked arms 65 bear against the upper surfaces of the expanded metal, deflector sections 67–70 to hold them in position on the perforated plate 61 and may have additionally a downwardly depending tab 66 adapted to press against the outer edges of the deflector sections so that the latter are properly positioned in the diffuser.

Instead of the spring arms or spring clips 64, there may be employed spring wire devices crossing over the expanded metal sections 67–70 and springably holding the latter against the perforated plate 61. The ends of the spring wire devices may be mounted in the frame 62.

Figure 13:
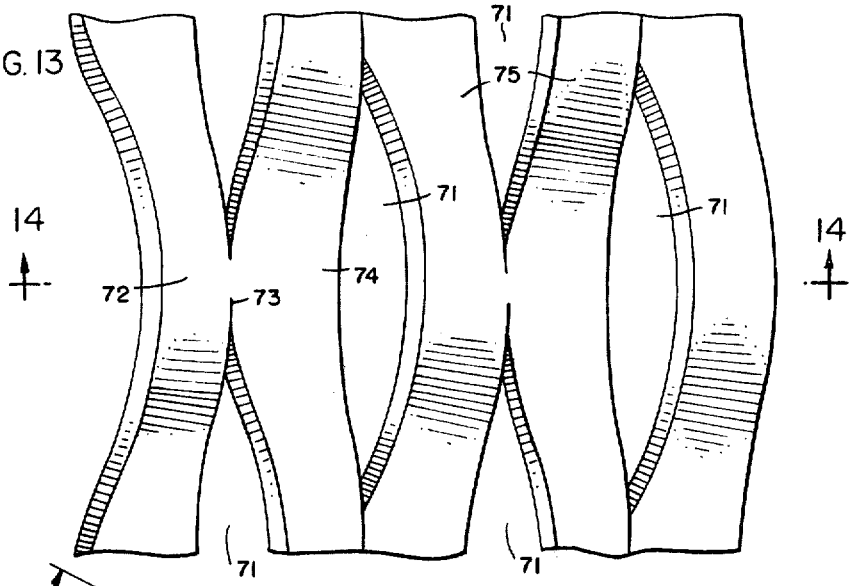
FIG. 13 is an enlarged, plan view of a fragment of an expanded metal deflector.
Figure 14:
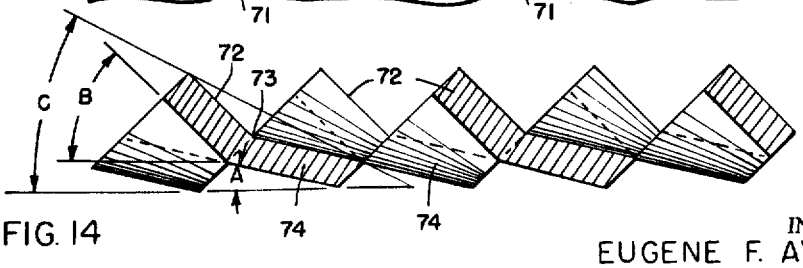
FIG. 14 is a section taken on section plane 14—14 of FIG. 13.

FIGS. 13 and 14 show pertinent relationships for the deflector webs and the open spaces therebetween of expanded metal deflector members and the like. The spaces 71 should be sufficiently large so that the "open area," which is the open area seen in a line of vision at right angles to the plane of the deflector member, is between 5 and 55% of the total area of the deflector. "Open area" is distinguished from free area of the openings 71 in that the latter applies to the unrestricted or open area when viewing the expanded metal member at an angle substantially parallel with the pitch of the deflector webs, i.e., the angle showing the largest open area between the deflector webs.

In FIGS. 13 and 14, the deflector webs at their junctures 73 have two pitches relative to the plane of the expanded metal member. The upper or upstream webs 72 at the junctures have a greater pitch, measured by angle B than the pitch of the downstream or lower webs 74, measured by angle A. The intermediate segments 75 of the webs between junctures are at angles intermediate angles A and B.

The angle C between the plane of the expanded metal member and imaginary plane through the uppermost and lowermost edges of the upper surface of the deflector vanes should be less than 50°. In expanded metal sections in which the deflector webs at their junctures are substantially planar, angle A equaling angle B, angle C is measured along the upper surface of the deflector members at their junctures and should also be less than 50°. In such case angles A, B and C are equal. In cases where angles A and B are not equal, angle A should also be less than angle B.

The open, webbed deflectors of the invention usually lie over an area of the perforated plate which is greater than the area of the inlet, i.e., the inlet sleeve on the top plate. This applies especially to situations wherein the outlet area of the diffuser is considerably greater than the inlet area, e.g., respective ratios of about 2:1 or higher. The outlet area in the context used above is the total area of the outlet opening of the diffuser without taking into consideration the imperforate areas of the perforated plate. Where, however, the inlet area approaches more closely the outlet area, the area of the open, webbed deflector may be somewhat smaller than the inlet area without loss of the lateral air discharge pattern. For example, the area of the open, webbed deflector may be somewhat less than the area of the inlet in a diffuser as previously described with a 10″ x 10″ inlet sleeve and a 12″ x 12″ outlet area.

Thus, the invention provides perforated face diffusers in which essentially all air-discharge, open area of the perforated face of the diffuser is utilized in a multiple choice of laterally-outward air discharge patterns. This feature further reduces the throw distance of the discharged air stream under given air supply condition over similar diffusers in which part of the perforated face is blocked off or inactivated to obtain the desired pattern. An additional advantage is the reduction of uneven discoloration of the perforated plate, the latter being noticeable where part of the perforated face is blocked off or inactivated. Other features and advantages such as ease in changing or setting the air discharge pattern through orientation of the deflector webs, the mounting of the latter in the diffuser, and the like will be appreciated by those experienced in the art.

The invention is hereby claimed as follows:

[1. An air distributing device comprising wall means defining an air passage having an inlet and an outlet of substantially larger area than the area of said inlet, a thin, substantially flat, perforated plate extending across said outlet, and an open, air deflector extending across said passage downstream of said inlet and upstream of said perforated plate, said air deflector having interlinked webs sloping relative to the general plane of said deflector with small openings between said interlinked webs for deflecting an air stream flowing through said device and out of the perforations of said perforated plate into a lateral air-discharge pattern.]

[2. An air distributing device as claimed in claim 1 wherein said deflector is made of expanded metal formed with said webs and said openings.]

[3. An air distributing device as claimed in claim 1 wherein said air deflector comprises selectively orientable sections, each section having webs sloping relative to the general plane of said deflector with openings between said webs.]

[4. An air distributing device as claimed in claim 1 wherein said air deflector comprises sections oriented as quadrants of said air deflector, each section having webs sloping relative to the general plane of said deflector with openings between said webs, and means releasably holding said sections in the desired air deflection orientation for each section to whereby said air distributing devices may be employed to give any one of several air throw patterns.]

[5. An air distributing device as claimed in claim 4 wherein said means comprises a clip member mounted on said perforated plate opposite said inlet and having clip portions holding said sections.]

[6. An air distributing device as claimed in claim 1 wherein said air deflector is held adjacent said perforated plate by at least one pin extending outwardly from the upstream face of said plate with its shank extending through said section, and means received on the shank holding said section thereon.]

[7. An air distributing device as claimed in claim 1 wherein said air deflector is pressed against the upstream face of said perforated plate by springable means mounted on said device and resiliently bearing against the upper upstream side of said air deflector.]

[8. An air distributing device as claimed in claim 7 wherein said perforated plate is mounted in a frame, means removably holding said frame in said device, and said springable means being mounted on said frame.]

[9. An air distributing device as claimed in claim 1 wherein the open area comprising the see-through area between adjacent edges of said webs at said openings as viewed in a direction normal to the plane of said deflector is 5–55% of the total area of said deflector in said plane.]

[10. An air distributing device as claimed in claim 9 wherein said deflector is an expanded metal formed with said openings and with interjoined webs of different pitch at the junctures of said webs, the pitches relative to said plane of the upstream webs at said junctures being at acute angles greater than the corresponding pitches of the downstream webs at said junctures.]

*1. An air distributing device comprising side walls defining an air passage of rectangular transverse cross section with an outwardly flaring, rectangular outlet at the downstream end of said passage, a cap plate extending across the upstream, inlet end of said passage, said cap plate having an air inlet opening therein opposite said outlet, a thin, substantially flat, rectangular perforated plate extending across said outlet of said passage for discharge of air from said outlet through the perforations in said perforated plate, the area of said inlet opening being less than the area of said outlet of said passage, an air deflector extending across said outlet on the upstream side of said perforated plate, said air deflector being opposite said inlet and covering an area of said perforated plate which is less than the total area of said perforated plate but greater than the area of said inlet opening, and said air deflector being at least one metal sheet having narrow webs integrally formed therein and pitched relative to the general plane of said deflector with narrow openings between said webs for lateral deflection of the air stream discharged through said perforated plate.*

*2. An air diffuser as claimed in claim 1, wherein said air deflector is composed of a plurality of separate metal sheet sections which are individually orientable, each section having its webs pitched in the same general direction, whereby said sections may be oriented with their respective webs all pitched in the same general direction to give a one way, lateral air discharge pattern or in at least two different directions to give a lateral air discharge pattern in at least two directions.*

*3. An air diffuser as claimed in claim 1, wherein said air deflector is composed of four separate metal sheet sections arranged as quadrants of said deflector, each section having its webs pitched in the same general direction, whereby said sections may be oriented to give a one-way to four-way lateral air discharge pattern.*

*4. An air distributing device comprising wall means defining an air flow chamber, an air inlet opening on the inlet side of said chamber, an air outlet on the outlet side of said chamber opposite said inlet opening, said outlet being of substantially larger area than the area of said inlet, a thin, substantially flat, perforated plate extending across said outlet, and an open, air deflector extending across said outlet adjacent the upstream side of said perforated plate and opposite said inlet, said air deflector being composed of a plurality of separate sections, each section being a metal sheet having narrow webs integrally formed therein and pitched relative to the general plane of said deflector and in the same general direction with narrow openings between said webs for deflecting an air stream flowing through said device into a lateral discharge pattern, and means releasably holding each section in the desired air deflection orientation whereby said sections may be oriented to give any one of several air throw patterns.*

*5. An air distributing device as claimed in claim 4, wherein said means comprises clip means having a clip portion holding each section in its selected oriented position.*

*6. An air distributing device as claimed in claim 4, wherein each section is held adjacent said perforated plate by a pin extending upwardly from the upstream face of said perforated plate with its shank extending through a respective section, and means received on each shank for holding the respective section thereon.*

*7. An air distributing device as claimed in claim 4, wherein said air deflector is composed of four of said separate metal sheet sections in a quadrant arrangement whereby said sections can be oriented to give a one way, two way, three way or four way lateral discharge pattern from said device.*

*8. An air distributing device as claimed in claim 4, wherein said sections are made from expanded metal formed to provide said webs and said openings.*

*9. An air distributing device as claimed in claim 4,*

*wherein each of said sections has its respective webs and openings therebetween oriented to provide an open area, as seen in a line of vision at right angles to the plane of said air section, of between 5 and 55% of the total area of said section.*

References Cited

The following references, cited by the Examiner, are of record in the patented file of this patent or the original patent.

UNITED STATES PATENTS

| | | | |
|---|---|---|---|
| 2,251,660 | 8/1941 | Chipley | 98—40 X |
| 2,821,898 | 2/1958 | Kennedy | 98—40 |
| 2,982,197 | 5/1961 | Roberts | 98—40 |
| 3,065,685 | 11/1962 | Sylvester et al. | 98—40 |
| 3,200,734 | 8/1965 | Burns et al. | 98—40 |

WILLIAM E. WAYNER, Primary Examiner